Patented Dec. 5, 1939

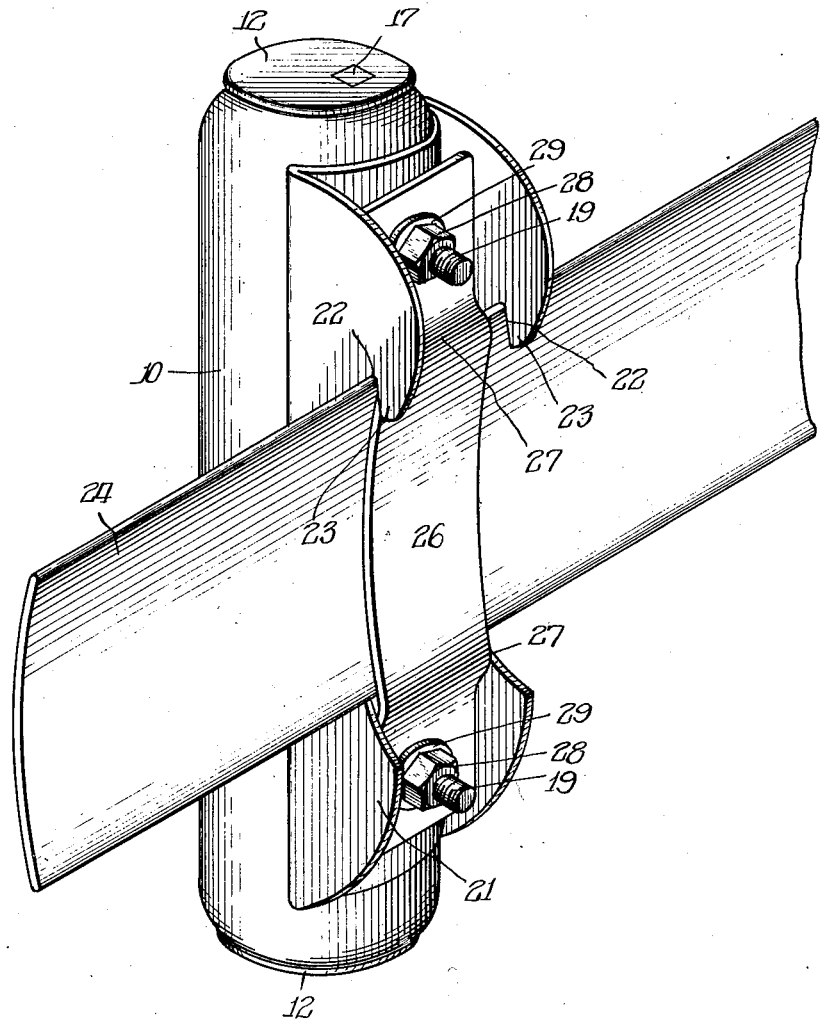

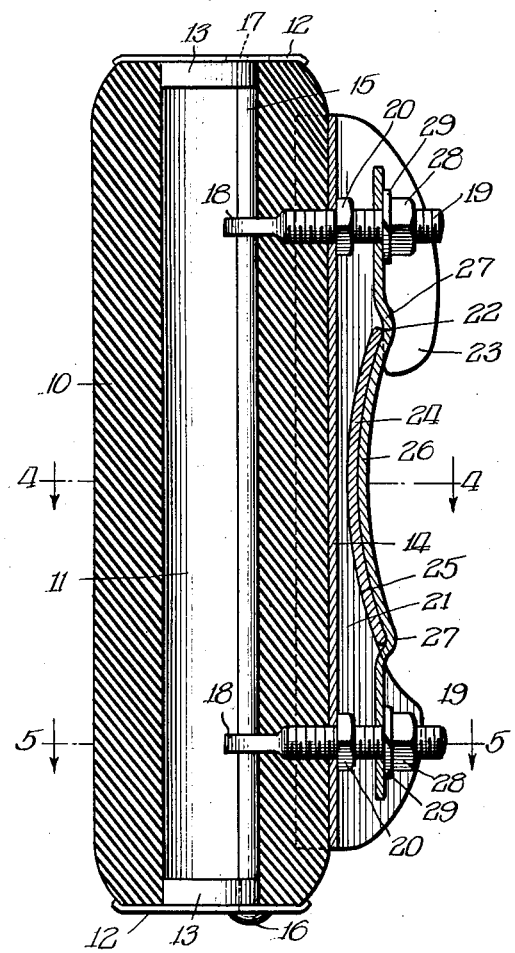
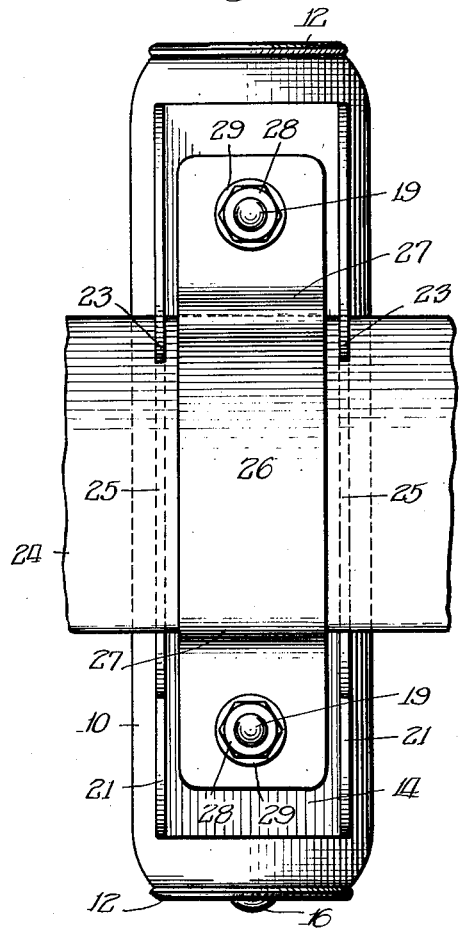
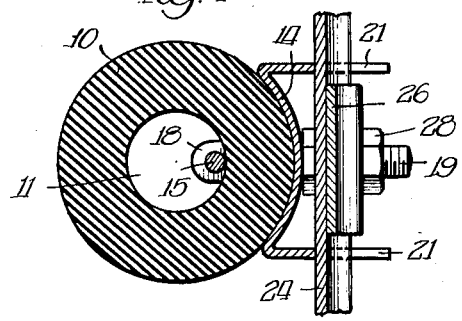
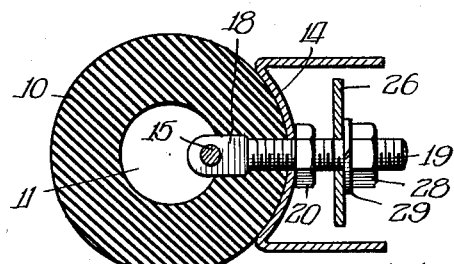

2,182,085

UNITED STATES PATENT OFFICE 2,182,085

SHOCK ABSORBER FOR AUTOMOBILES

John E. Kellner and Emery Kellner, Chicago, Ill.

Application November 4, 1937, Serial No. 172,690

7 Claims. (Cl. 293—55)

The present invention is related to bumpers for automobiles, and more particularly is concerned with the shock absorbers employed therewith.

The main and primary object of this invention is the provision of a shock absorber of the character mentioned of simplified construction to permit its manufacture and sale at a relatively low figure, and one which may be assembled readily with the bumper to which it is attached without the employment of skilled labor and by the use of ordinary tools.

It has as a further object the provision of a shock absorber capable of resisting and taking up the force of impact to which it may be subjected so as to reduce to a minimum the transmission of such force to the chassis of the automobile. The chassis and the vital elements of the automobile thus are protected, and such portion of the impact as may reach the chassis will be dissipated and its injurious and damaging effect lost.

Other objects and advantages will appear as the nature of the improvements is better understood, the invention consisting substantially in the novel construction, combination and arrangement of parts hereinafter fully described, illustrated in the accompanying drawings, and finally pointed out in the appended claims.

While the form of the invention herein disclosed is believed to be a preferred embodiment thereof, it is to be understood that the same is susceptible of change, modification and variation as to the construction, arrangement and organization of its parts. The present disclosure, therefore, is to be considered from the illustrative standpoint and not as imposing restriction or limitation on the invention.

In the drawings,

Fig. 1 is a perspective view of a shock absorber constructed in accordance with the present invention and illustrated as applied to an automobile bumper bar;

Fig. 2 is a vertical transverse sectional view thereof;

Fig. 3 is an elevational view of the same, the absorber being detached from the bumper bar; and Figs. 4 and 5 are sectional plan views, as on the lines 4—4, and 5—5, Fig. 2, respectively.

Referring in detail to the accompanying drawings, the numeral 10 designates a cylindrical buffer member. This is formed of rubber capable of yielding under the impact of a body that may contact said member. It is of sufficient length to project above and below the bumper bar of an automobile bumper, and by reason of its yielding characteristics the buffer member will take up the shock of impact when such arises. By referring to Figs. 2, 4 and 5 it will be noted that the walls of the member 10 are relatively thick, and while possessing yielding characteristics the walls will prevent total collapse of the member when contact of a body, under force, with the member 10 arises.

The buffer member 10 has a bore 11 which extends throughout its length, and said bore is closed at its ends by a plurality of cap plates 12 each of which has a centering plug 13 formed thereon, which plugs fit within the ends of the bore 11, as clearly seen in Fig. 2.

The buffer member 10 is mounted on a supporting bracket 14, the body of said member being concavo-convex so as to present a dished horizontal cross-section and thereby fit against and receive the circular contour of the member 10. The supporting bracket is substantially the length of the buffer member 10, being formed of metal, and said bracket, therefore, provides a non-yielding reinforcement for the member 10 so as to hold the latter rigidly in position upon the bar of the bumper.

Arranged within the bore 11 of the member 10 is a tie rod 15, one end of said rod having a head 16 formed thereon, while its opposite end 17 is upset. The ends of the rod 15 pass through the cap plates 12, and by reason of the head 16 and the upset end 17 said cap plates are held effectually in position at the ends of the bore 11.

The tie rod 15 is received by eyes 18 formed at the inner ends of a plurality of attaching bolts 19, and said eyes 18 lie within the bore 11 for the reception of the tie rod 15. The attaching bolts 16 pass through the wall of the buffer member 10 so as to project at the exterior thereof, and likewise extend through the attaching bracket 14. Clamping nuts 20 are mounted upon the threaded shanks of the attaching bolts, and when tightened sufficiently on the bolts the buffer member 10 and the supporting bracket are firmly held together.

The supporting bracket 14 has a pair of oppositely-disposed parallel side flanges 21 which extend through the length of the body of the bracket, the upper ends of said flanges 21 being notched, as at 22, in order to provide a pair of oppositely-arranged marginally-mounted supporting hooks 23. These hooks fit over the upper edge of the bar 24 of an automobile bumper, which bar is of the usual formation and contour, that is to say, it has the customary curvature in cross section so as to prevent a concavo-convex shape. The edges of the flanges 21 are curved, as at 25, to conform to the curvature of the bar 24, and these curved portions 25 of said flanges afford seats against which the convex face of the bar 24 will fit.

For effecting the locking of the supporting bracket on the bumper bar 24 a clamping plate 26 is arranged at the inner face of the bar 24, the body of the plate 26 being also curved in general conformity with the curvature of the bar 24 so as to fit against said inner face of the latter. The clamping plate 26 is provided with upper and lower offsets 27 which form shoulders against which the upper and lower edges of the bar 24 will fit when the parts are assembled, and as shown in Fig. 2. This clamping plate is elongated and extends between the attaching bolts 19, each of its ends being perforated so that said perforated ends fit over and receive the threaded shanks of the attaching bolts 19. A locking nut 28 is associated with each of the bolts 19, a locking washer 29 being interposed between each of the perforated ends of the plate 26 and the adjacent locking nut 28. The nuts 28 and the washers 29 serve to hold the clamping plate 26 pressed against the bumper bar 24, and thus effectually hold the shock absorber, in its entirety, on the bumper bar.

It will be noted that by reason of the flanged formation of the supporting bracket 14 the same is substantially U-shape in cross section, and being formed of metal the same may be readily stamped from a blank and bent into its ultimate shape by forming dies, so that the cost of production of the supporting bracket may be relatively small. By reason of this U-shaped formation the bracket provides a housing for the projecting ends of the attaching bolts 19 and the clamping plate 26, serving effectually to conceal these parts.

In assembling the herein described shock absorber the cap plates 12 are placed in the ends of the bore 11 and fastened in position therein by the tie rod 15 which connects these plates. With the attaching bolts 19 connected to the tie rod 15, and passing also through the wall of the buffer member 10, the supporting bracket 14 may be readily assembled on the buffer member and clamped into position thereon by the application of the nuts 20. With the clamping plate 26 removed from the attaching bolts, the hooks 23 may be engaged with the upper edge of the bumper bar 24, whereupon the clamping plate 26 has its perforated ends applied to the attaching bolts 18, the offsets 27 fitting over the edges of the bumper bar 24. The locking washers 29 and the nuts 28 then being applied to the threaded shanks of the bolts 18, the clamping plate 26 may be tightened against the bumper bar 24 to the required extent to hold the shock absorber in its entirety in rigid relation on the bar.

It will be apparent that when the herein described absorber is applied to an automobile bumper the buffer member 10 will readily yield under the impact of a body that may contact with the same. The degree of yield will vary with the degree of the force of the impact. When pressure is thus exerted the yielding body 10 will absorb the force of the impact and the latter will be dissipated by such absorption. Thus the force of the blow will be softened to such extent that but a minimum amount thereof will be transmitted to the bumper bar. Hence, the chassis and the vital parts of the automobile with which the bumper may be employed is protected against the transmission of the shock incidental to the impact.

Any number of the herein described absorbers may be placed upon a bumper bar, being separated thereover, and located at such points thereon, as to give to the automobile equipped with the same the maximum degree of protection.

The absorber is of particular utility in the parking of automobiles in alignment along the curbing of a pavement where cars are spaced but relatively short distances apart, and where but limited room is afforded when it is desired to remove a car from the parked area. In such locations it repeatedly requires that cars must be moved into contact with those in advance and in rear of the same, and in such circumstances the present absorber readily will take up the force of the impact in the jockeying movements of the cars when being released from the crowded spaces in which they are parked.

We claim:

1. A shock absorber of the class described, comprising a tubular rubber buffer member, an attaching bracket, means for holding the buffer member in associated relation with the attaching bracket, oppositely-arranged hooked members marginally-mounted on the attaching bracket for engaging a bumper bar for holding the attaching bracket in suspended relation with respect to said bumper bar, and means for locking the attaching bracket to said bumper bar.

2. A shock absorber of the class described, comprising a yielding buffer member, an attaching bracket conforming to the contour of the buffer member and receiving the latter, said attaching bracket having a plurality of marginal parallel flanges each of which is provided with a notch for receiving a bumper bar, whereby to position the attaching bracket in suspended relation to the bumper bar, and means for locking the attaching bracket to said bumper bar.

3. A shock absorber of the class described, comprising a tubular yielding buffer member, an attaching bracket, a plurality of attaching members carried by the buffer member and projecting at the exterior of the latter, said attaching members extending through said attaching bracket and projecting beyond the same, means carried by the attaching bracket and engaging a bumper bar to hold the attaching bracket in suspended relation thereon, and clamping means cooperating with said attaching members for holding the attaching bracket in clamped relation to the bumper bar.

4. A shock absorber of the class described, comprising a yielding tubular buffer member, an attaching bracket conforming to the contour of the buffer member and receiving the latter, attaching bolts carried by the buffer member and extending through the attaching bracket, means associated with said bolts for holding the attaching bracket in clamped relation to the buffer member, means carried by the attaching bracket for engaging a bumper bar, a clamping plate fitted to said attaching bolts and adapted to embrace the bumper bar when the attaching bracket is applied to the latter, and means for holding the clamping plate in engaged relation with the attaching bolts.

5. A shock absorber of the class described, comprising a tubular buffer member, an attaching bracket, cap plates associated with the buffer member for closing the ends thereof, a tie rod fitted within the buffer member and engaged with said cap plates, a plurality of attaching bolts fitted to said tie rod and projecting at the exterior of the buffer member, said attaching bolts also extending through said attaching bracket, means carried by said bolts for fastening the attaching bracket to the buffer member, means carried by the attaching bracket for engaging a bumper bar to hold the attaching bracket in suspended relation to said bar, a clamping plate fitted to the fastening bolts and engaging the bumper bar, and means associated with the fastening bolts for holding the clamping plate in engaged relation with said fastening bolts, whereby to hold the fastening bracket in engagement with the bumper bar.

6. A shock absorber of the class described, comprising an elongated cylindrical buffer member, an elongated attaching bracket dished in cross-section to conform to the cylindrical contour of the buffer member and receiving the latter, means for holding the buffer member in associated relation with the attaching bracket, oppositely-arranged hooked members marginally-mounted on the attaching bracket for engaging a bumper bar for holding the attaching bracket in suspended relation with respect to said bumper bar, and means for locking the attaching bracket to said bumper bar.

7. A shock absorber of the class described, comprising an elongated cylindrical buffer member, an elongated attaching bracket dished in cross-section to conform to the cylindrical contour of the buffer member and receiving the latter, means for holding the buffer member in associated relation with the attaching bracket, the latter having a plurality of parallel flanges, oppositely-arranged hooked members carried by said flanges for engaging a bumper bar for holding the attaching bracket in suspended relation with respect to said bumper bar, and means for locking the attaching bracket to said bumper bar.

JOHN E. KELLNER.
EMERY KELLNER.